(12) United States Patent
Kitadani et al.

(10) Patent No.: US 7,726,272 B2
(45) Date of Patent: Jun. 1, 2010

(54) VARIABLE INTAKE DEVICE

(75) Inventors: Hironori Kitadani, Nishikamo-gun (JP); Kazuyoshi Abe, Susono (JP); Chiemi Sasaki, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 405 days.

(21) Appl. No.: 11/918,036

(22) PCT Filed: Apr. 19, 2006

(86) PCT No.: PCT/JP2006/308688

§ 371 (c)(1), (2), (4) Date: Oct. 9, 2007

(87) PCT Pub. No.: WO2006/112545

PCT Pub. Date: Oct. 26, 2006

(65) Prior Publication Data

US 2009/0050096 A1 Feb. 26, 2009

(30) Foreign Application Priority Data

Apr. 20, 2005 (JP) ............................. 2005-122432

(51) Int. Cl.
F02M 35/10 (2006.01)
(52) U.S. Cl. ............................. 123/184.53; 123/184.55
(58) Field of Classification Search ............ 123/184.53, 123/184.55
See application file for complete search history.

(56) References Cited

U.S. PATENT DOCUMENTS 6,193,214 B1    2/2001   Schatz 6,502,542 B1    1/2003   Stuart
2002/0005185 A1 1/2002   Schatz

FOREIGN PATENT DOCUMENTS

| DE | 198 30 859 A1 | 3/2000 |
|----|---------------|--------|
| EP | 1 498 589 A   | 1/2005 |
| JP | 061176/1990   | 5/1990 |
| JP | 02-196125     | 8/1990 |

(Continued)

OTHER PUBLICATIONS

Japan Institute of Invention and Innovation Technical Report No. 2004-501552, Mar. 3, 2004, Toyota Jidosha Kabushiki Kaisha.

Primary Examiner—Noah Kamen
(74) Attorney, Agent, or Firm—Kenyon & Kenyon LLP (57) ABSTRACT

A variable intake device includes an intake pipe through which air flows towards a combustion chamber of an engine, defining a first streamline at an intermediate portion of the pipe, a short-circuit pipe connected at the intermediate portion, defining a second streamline crossing the first streamline at the connected other end, and a valve arranged at the short-circuit pipe adjacent to the intermediate portion. The valve includes a valve body regulating air flow. When the valve allows air flow merging into the intake pipe from the short-circuit pipe, the valve body is positioned to extend in a direction between the extending direction of the first streamline indicated by arrow and the extending direction of the second streamline indicated by arrow. By such a configuration, a variable intake device having pressure loss at the intake path sufficiently reduced can be provided.

1 Claim, 5 Drawing Sheets

FOREIGN PATENT DOCUMENTS

| | | |
|---|---|---|
| JP | 03-080966 | 12/1991 |
| JP | 04-272426 A | 9/1992 |
| JP | 05-017123 U | 3/1993 |
| JP | 5-36037 | 5/1993 |
| JP | 05-125944 A | 5/1993 |
| JP | 07-166877 A | 6/1995 |
| JP | 10-299491 A | 11/1998 |
| JP | 10-299594 A | 11/1998 |
| JP | 11-241636 | 9/1999 |
| JP | 2002-276380 A | 9/2002 |
| JP | 2005-325824 A | 11/2005 |

VARIABLE INTAKE DEVICE

This is a 371 national phase application of PCT/JP2006/308688 filed 19 Apr. 2006, which claims priority of Japanese Patent Application No. 2005-122432 filed 20 Apr. 2005, the contents of which are incorporated herein by reference.

TECHNICAL FIELD

The present invention generally relates to variable intake devices, and more particularly to a variable intake device switching the effective intake path length of an internal combustion engine through an operation of a valve.

BACKGROUND ART

In connection with a conventional variable intake device, Japanese Patent Laying-Open No. 2002-276380, for example, discloses a variable intake device directed to improving the mountability to a V-type internal combustion engine in an engine room. The variable intake device disclosed in Japanese Patent Laying-Open No. 2002-276380 has a short-circuit pipe communicating with a first surge tank during the path of an intake manifold. A valve to open/close the short-circuit pipe is provided in the path of the pipe.

Further, Japanese Patent Laying-Open No. 10-299594 discloses a method of attaching a variable intake valve in order to ensure the accuracy of the flow. The variable intake valve disclosed in Japanese Patent Laying-Open No. 10-299594 establishes communication between a surge tank chamber and an intake pipe. A valve body constituting the variable intake valve is provided with a rotatable flat valve plug connected to a valve shaft.

As disclosed in the aforementioned Japanese Patent Laying-Open Nos. 2002-276380 and 10-299594, a variable intake device is provided with a short-circuit pipe shunting between a surge tank and an intake pipe. A valve to control the air flow within the pipe is arranged in the short-circuit pipe. The air flow in the short-circuit pipe is cut off by closing the valve, forming a relatively long intake path corresponding to the intake pipe.

When the valve is open, air flow within the short-circuit pipe is allowed, forming a relatively short intake path shunting between the surge tank and the intake pipe. In order to minimize the pressure loss at the site where the valve is located, the valve is open parallel to the streamline of the air flow within the short-circuit pipe. If a smooth connection is not established between the short-circuit pipe and the intake pipe, air cannot merge smoothly from the short-circuit pipe into the intake pipe. Deviation of the air flow will occur, leading to the possibility of increasing pressure loss.

DISCLOSURE OF THE INVENTION

In view of the foregoing, an object of the present invention is to provide a variable intake device having pressure loss on an intake path sufficiently reduced.

A variable intake device according to the present invention is directed to a variable intake device altering the intake path length of an internal combustion engine. The variable intake device includes a main pipe through which air flows towards a combustion chamber of an internal combustion engine, defining a first streamline at a predetermined site on a path, a short-circuit pipe connected at the predetermined site, defining a second streamline extending in a direction crossing the first streamline at the connected site, and a valve arranged at the short-circuit pipe, adjacent to the predetermined site. The valve includes a valve body regulating the air flow. When the valve allows an air flow merging into the main pipe from the short-circuit pipe, the valve body is positioned to extend in a direction between the extending direction of the first streamline and the extending direction of the second streamline.

In accordance with the variable intake device configured as set forth above, the flowing direction of air merging into the main pipe from the short-circuit pipe is altered from the direction along the second streamline to an extending direction of the valve body of the valve when the valve allows air flow within the short-circuit pipe, i.e. when the valve is open. Since the extending direction of the valve body is located between the extending direction of the first streamline and the extending direction of the second streamline in this case, the flowing direction of air is altered to a direction closer to the direction along the first streamline. Accordingly, the air can be made to merge more smoothly into the main pipe from the short-circuit pipe. Thus, pressure loss at the intake path can be reduced to allow improvement of the performance of the internal combustion engine.

The valve also includes a valve stem that rotatably supports the valve body. Preferably, the valve stem is provided at a position deviated towards the upstream side of the air flow in the main pipe with respect to the center position of a cross-section of the short-circuit pipe when cut by a plane orthogonal to an extending direction of the short-circuit pipe.

In accordance with the variable intake device configured as set forth above, the amount of air flow passing through the site where the valve is provided can be increased at the downstream side of the air flow in the main pipe with respect to the valve body. Accordingly, more air can be made to merge smoothly into the main pipe from the short-circuit pipe. The pressure loss at the intake path can be reduced further effectively.

According to the present invention, a variable intake device having pressure loss on the intake path reduced sufficiently can be provided.

BEST MODE FOR CARRYING OUT THE INVENTION

Embodiments of the present invention will be described with reference to the drawings. In the drawings, the same or corresponding members have the same reference number allotted.

First Embodiment

Figure 1:
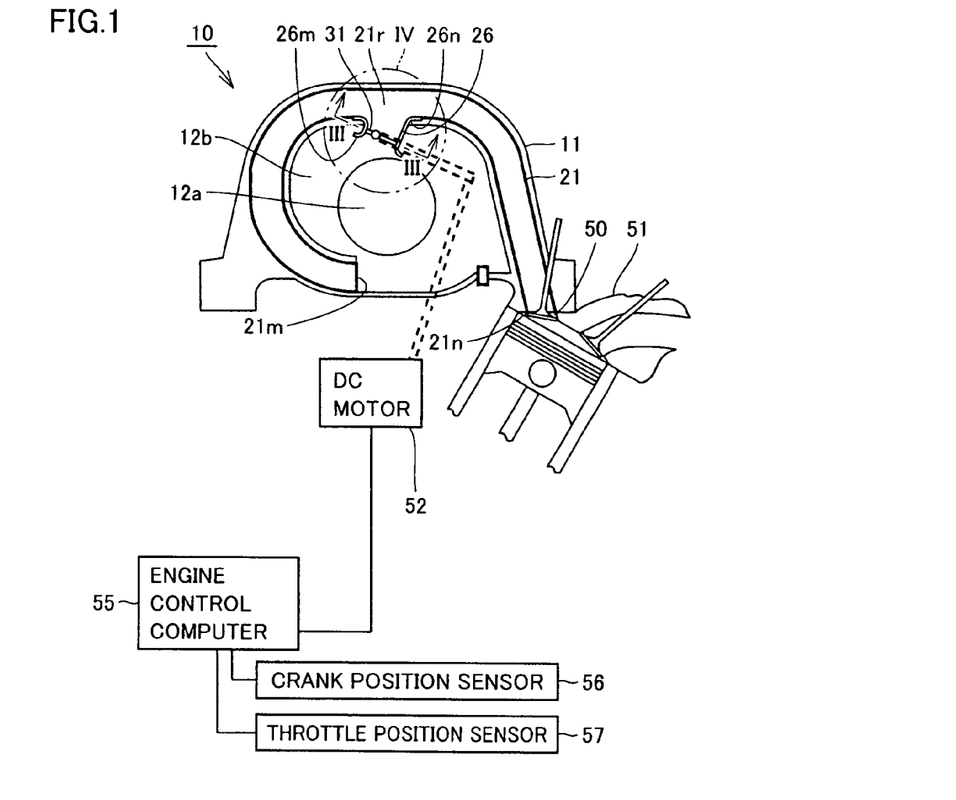
FIG. 1 is a diagram of a structure of a vehicle V-type multi-cylinder engine provided with a variable intake device according to a first embodiment of the present invention.
Figure 2:
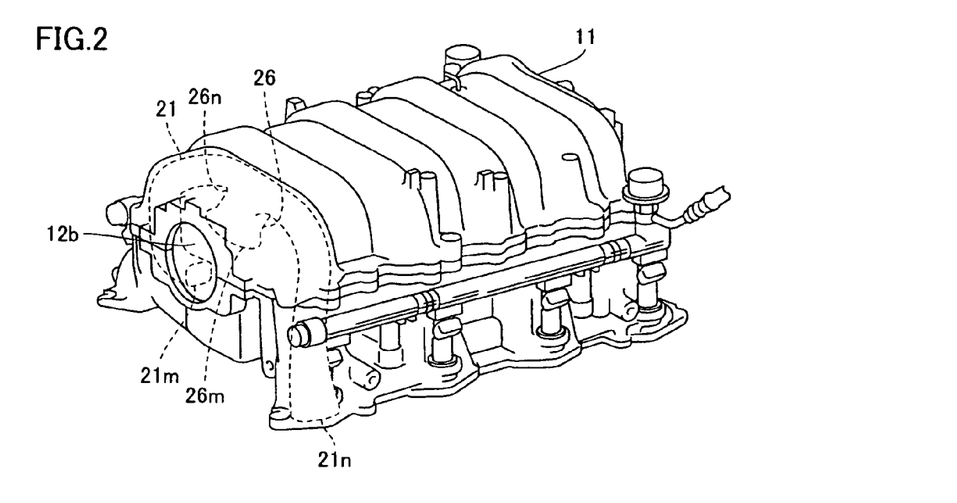
FIG. 2 is a perspective view of an intake manifold in the engine of FIG. 1.

FIG. 1 is a diagram of a structure of a vehicle V-type multi-cylinder engine in which a variable intake device according to a first embodiment of the present invention is provided. FIG. 2 is a perspective view of an intake manifold in the engine of FIG. 1.

Referring to FIGS. 1 and 2, an engine 10 includes a cylinder head 51 formed with an intake port 50 communicating with a combustion chamber, and an intake manifold 11 attached to cylinder head 51. Intake manifold 11 serves to distribute the air input from the front side of the vehicle to each cylinder in engine 10. Intake manifold 11 is connected by means of a hose to an air intake through which outside air enters. A throttle, air cleaner, and resonator are arranged between the air intake and intake manifold 11.

At intake manifold 11, there is provided a surge tank 12b where air supplied to intake manifold 11 flows from the air intake through the throttle. Surge tank 12b extends in the direction along which a plurality of cylinder sets of the left and right banks of engine 10 are aligned, i.e. extending in the longitudinal direction of the vehicle in the present embodiment. Intake manifold 11 has a plurality of sets of intake pipe 21 and short-circuit pipe 26 aligned side by side in the extending direction of surge tank 12b. The set of intake pipe 21 and short-circuit pipe 26 establishes communication alternately between surge tank 12b and the cylinder of the left bank and between surge tank 12b and the cylinder of the right bank along the aligning direction thereof.

Intake pipe 21 includes one end 21m opening at the lower side of surge tank 12b in the vertical direction, and the other end 21n communicating with intake port 50. Intake pipe 21 extends from one end 21m around surge tank 12b to arrive at the upper side of surge tank 12b in the vertical direction, and further around surge tank 12b towards the other end 21n. Intake pipe 21 extends from one end 21m to the other end 21n in a curved manner. Surge tank 12b communicates with intake port 50 by means of intake pipe 21.

Short-circuit pipe 26 includes one end 26m opening at the upper side of surge tank 12b in the vertical direction, and the other end 26n communicating with intake pipe 21. Short-circuit pipe 26 is connected with intake pipe 21 at an intermediate portion 21r located between one end 21m and the other end 21n. The path length of short-circuit pipe 26 is shorter than the path length of intake pipe 21. The total length of the path length of short-circuit pipe 26 and the path length from intermediate portion 21r of intake pipe 21 to the other end 21n is shorter than the path length from one end 21m of intake pipe 21 to the other end 21n. Short-circuit pipe 26 is provided to avoid, as much as possible, overlapping a projection plane 12a of the throttle in the longitudinal direction of the vehicle. At short-circuit pipe 26, a valve 31 controlling the air flow in short-circuit pipe 26 is provided adjacent to intermediate portion 21r.

Engine 10 further includes a DC motor 52 operating valve 31, and an engine control computer 55 sending a signal to DC motor 52 at an appropriate time in response to a signal from a crank position sensor 56 and a throttle position sensor 57. Valve 31 may be operated by an actuator and a VSV (Vacuum Switching Valve) controlling the negative pressure on the actuator.

When valve 31 is closed, the air flow of short-circuit pipe 26 is cut off. At this stage, the air flowing through surge tank 12b is supplied to intake port 50 via intake pipe 21. In contrast, when valve 31 is open, the air flow of short-circuit pipe 26 is allowed. At this stage, the air flowing through surge tank 12b merges mainly into intake pipe 21 from short-circuit pipe 26, and further passes through intake pipe 21 to be supplied to intake port 50.

By such opening/closing of valve 31, the intake path length from surge tank 12b to intake port 50 can be switched in two stages. Accordingly, the intake amount of air flow can be increased taking advantage of the pulsating effect in the intake path to achieve torque increase in all regions from low rotation to high rotation.

Figure 3:
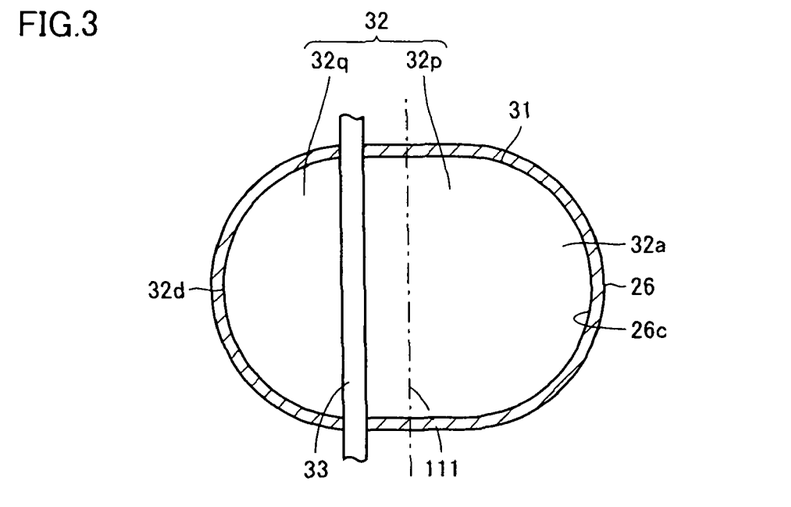
FIG. 3 is a sectional view of a short-circuit pipe taken along line III-III of FIG. 1.

FIG. 3 is a sectional view of the short-circuit pipe taken along line III-III of FIG. 1. In the drawing, a cross section of the short-circuit pipe when cut by a plane orthogonal to the air flow is shown. Referring to FIG. 3, an inner wall 26c defining short-circuit pipe 26 has a track-like cross section (an ellipse composed of two semi-circles connected by straight lines). Valve 31 includes a rotatably supported valve stem 33 connected to DC motor 52 of FIG. 1, and a valve body 32 extending from valve stem 33.

Figure 4:
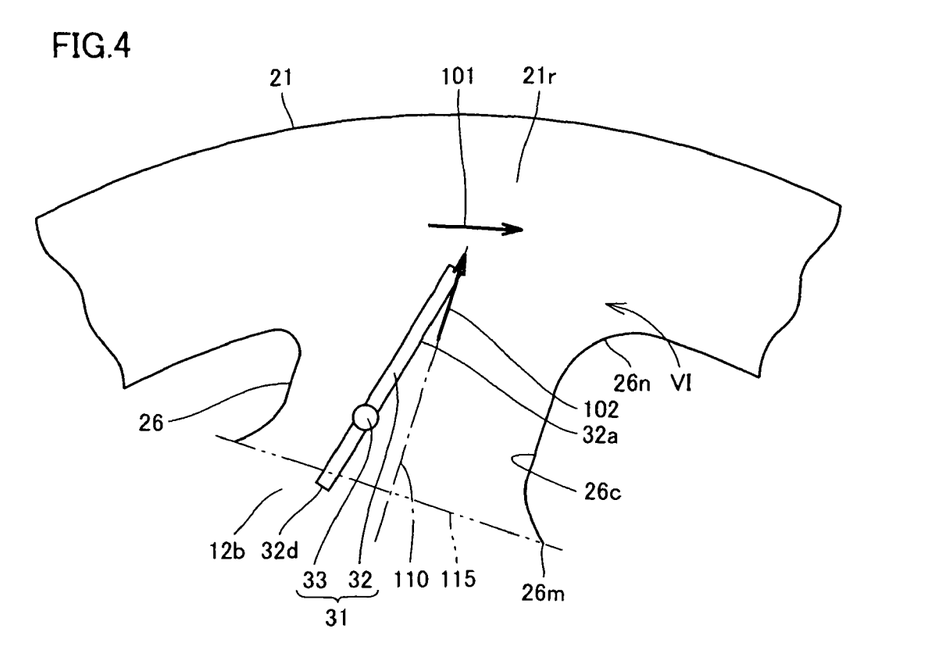
FIG. 4 is a sectional view of an intake pipe and a short-circuit pipe corresponding to a valve-open state.
Figure 5:
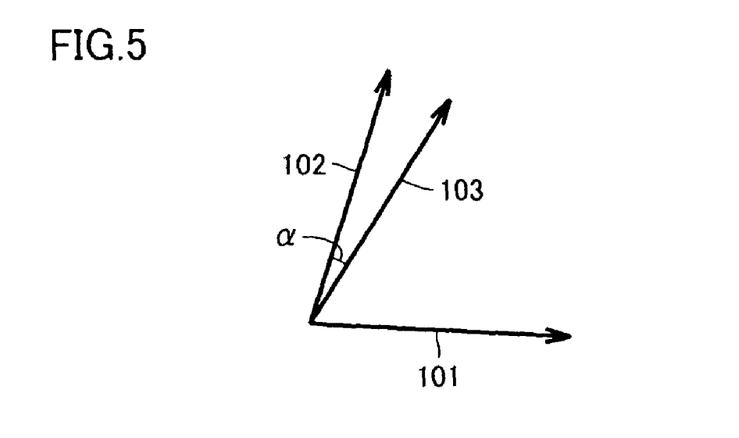
FIG. 5 indicates the extending direction of a valve body in a valve-open state.

FIG. 4 is a sectional view of an intake pipe and short-circuit pipe representing a valve-open state. In the drawing, the region encircled by the two-dot chain line IV in FIG. 1 is shown. FIG. 5 represents the extending direction of the valve body in a valve-open state.

Referring to FIGS. 3-5, intake pipe 21 defines the streamline of the air flow extending in the direction indicated by arrow 101 at an intermediate portion 21r where short-circuit pipe 26 is connected. Short-circuit pipe 26 defines a streamline extending in the direction indicated by arrow 102 at the other end 26n communicating with intake pipe 21. The extending direction of these streamlines is determined at the center position of a cross section of intake pipe 21 and short-circuit pipe 26 cut by a plane orthogonal to the extending direction of the pipes at intermediate portion 21r and the other end 26n, respectively.

Short-circuit pipe 26 intersects intake pipe 21 diagonally, forming an acute angle between the direction indicated by arrow 101 and the direction indicated by arrow 102. In an open state of valve 31, valve body 32 is positioned to extend in a direction (the direction indicated by arrow 103 in FIG. 5) between the direction of the streamline defined by intake pipe 21 at intermediate portion 21r (the direction indicated by arrow 101) and the direction of the streamline defined by short-circuit pipe 26 at the other end 26n (the direction indicated by arrow 102). The extending direction of valve body 32 is located within a range of the direction of the streamline defined by intake pipe 21 and the direction of the streamline defined by short-circuit pipe 26 forming an angle smaller than 180°, i.e. a range constituting an acute angle in the present embodiment. Inner wall 26c of short-circuit pipe 26 and the inner wall of intake pipe 21 are smoothly continuous while forming a curve.

In an open state of valve 31, valve body 32 has a surface 32a corresponding to the downstream side of the air flow in intake pipe 21. Surface 32a is directed obliquely towards the downstream side from the upstream side of the air flow in intake pipe 21 as a function of approaching the other end 26n from one end 26m.

By such a configuration, the opening of valve 31 causes the direction of air flow at the other end 26n to be altered from the direction indicated by arrow 102 to the direction indicated by arrow 103, more approximating the direction indicated by arrow 101. Accordingly, the air flow in short-circuit pipe 26 can be made to merge into intake pipe 21 more smoothly.

Valve stem 33 extends in the longitudinal direction of the vehicle corresponding to the extending direction of surge tank 12b. When a center line 110 is defined at the center of the cross section of short-circuit pipe 26 cut by a plane orthogonal to the extending direction of short-circuit pipe 26, valve stem 33 is provided at the upstream side of the air flow in intake pipe 21 with respect to center line 110, i.e. at one end 21m side in FIG. 1.

Valve body 32 is constituted of a portion 32p extending with a relatively large area at one side of valve stem 33, and a portion 32q extending with a relatively small area at the other side of valve stem 33. Valve stem 33 is provided at a position deviated from the center line 111 of the track-shaped cross section defining the cross section of inner wall 26c. A periphery portion 32d of portion 32q located most distant from valve stem 33 protrudes from an opening plane 115 of short-circuit pipe 26 at one end 26m in an open state of valve 31.

By such a configuration, the distance between surface 32a of valve body 32 and inner wall 26c of short-circuit pipe 26 facing surface 32a increases in the open state of valve 31. Accordingly, the amount of air changed in course to the desired direction by valve body 32 can be increased. At this stage, valve body 32 functions as a wall of the channel in short-circuit pipe 26. Therefore, the air flowing through surge tank 12b can be guided stably into intake pipe 21 even if the length of short-circuit pipe 26 is set short. Accordingly, sufficient capacity of surge tank 12b can be ensured without having to increase the overall height of engine 10.

The variable intake device according to an embodiment of the present invention corresponds to a variable intake device altering the intake path length of engine 10 qualified as an internal combustion engine. The variable intake device includes intake pipe 21 through which air flows towards the combustion chamber of engine 10, and qualified as the main pipe defining the first streamline at intermediate portion 21r corresponding to a predetermined site of the path, a short-circuit pipe 26 connected to intermediate portion 21r, and defining the second streamline extending in a direction crossing the first streamline at the other end 26n corresponding to the connected site, and valve 31 arranged in short-circuit pipe 26, adjacent to intermediate portion 21r. Valve 31 includes valve body 32 regulating the air flow. When valve 31 allows air flow merging into intake pipe 21 from short-circuit pipe 26, valve body 32 is positioned to extend in a direction (the direction indicated by arrow 103) between the extending direction of the first streamline (the direction indicated by arrow 101) and the extending direction of the second streamline (the direction indicated by arrow 102).

According to the variable intake device of the first embodiment configured as set forth above, occurrence of deviation of air flow at the merging site of short-circuit pipe 26 to intake pipe 21 can be suppressed at the time of opening valve 31. Accordingly, pressure loss in the intake path can be reduced to allow more air to be introduced into intake port 50. By adjusting the opening of valve 31 at an appropriate position between an open state and a closed state, an arbitrary swirl flow or tumble flow (particularly, tumble flow) can be generated in the combustion chamber.

The internal combustion engine to which the present invention is applied is not limited to a gasoline engine, and may be a diesel engine. Further, various engine types can be numerated such as an in-line type, V-type, W-type, and horizontally opposed type. Intake manifold 11 may be located at the front, middle, or rear of the vehicle. Further, intake pipe 21 and short-circuit pipe 26 may be formed of a member different from that of surge tank 12b.

Furthermore, the variable intake device of the present invention may be applied to an engine other than for a vehicle, for example, an engine for generating electricity.

Figure 6:
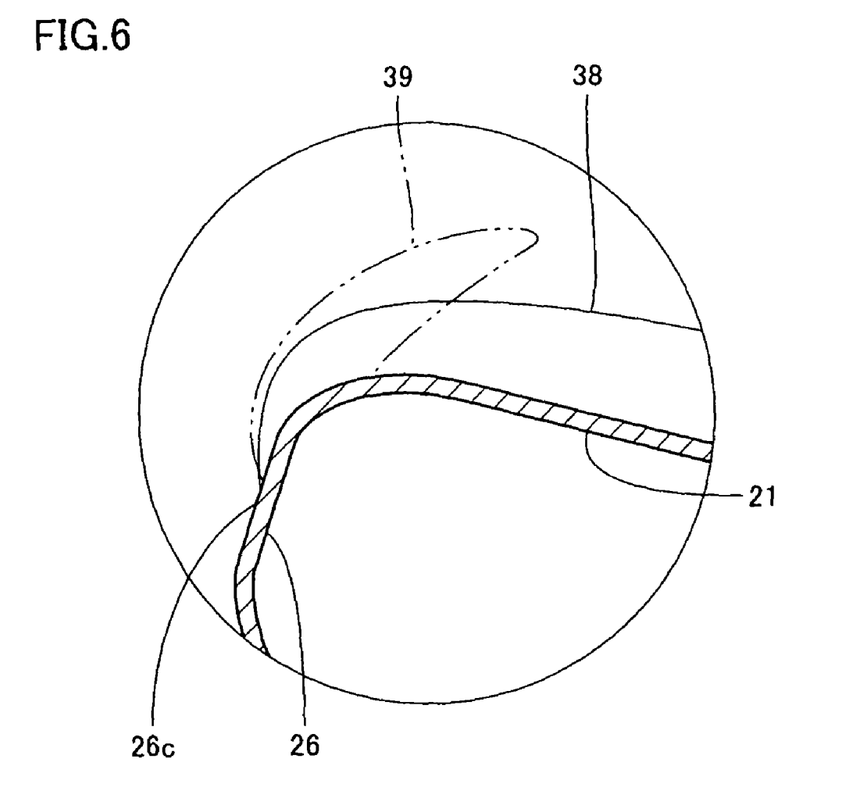
FIG. 6 represents a flow velocity distribution at the site indicated by arrow VI of FIG. 4.

FIG. 6 represents a flow velocity distribution at the site indicated by arrow VI in FIG. 4. Referring to FIG. 6, a simulation of obtaining the velocity distribution in the pipe when the valve is open was run. At the merging site from short-circuit pipe 26 to intake pipe 21, a high flow velocity was achieved in the area encircled by a solid line 38 extending from the inner wall of the pipe. For the sake of comparison, a flow velocity distribution in the pipe when the valve body is positioned parallel to the streamline direction defined by short-circuit pipe 26 was obtained. In this comparison example, a high flow velocity was obtained in the area encircled by a two-dot chain line 39.

In the comparison example, the area of high flow velocity was formed broadly from the inner wall of the pipe towards the center at the merging site of short-circuit pipe 26 to intake pipe 21. As a result, deviation occurred even at a site greatly distant from the inner wall of the pipe, resulting in a small effective pipe diameter of the flow. In contrast, it is appreciated from the simulation of the present embodiment that the area where the flow velocity becomes high is restricted to the neighborhood of the inner wall of the pipe. Occurrence of deviation could be suppressed effectively. Therefore, the effective pipe diameter of the flow becomes larger to allow increase of the flow.

Figure 7:
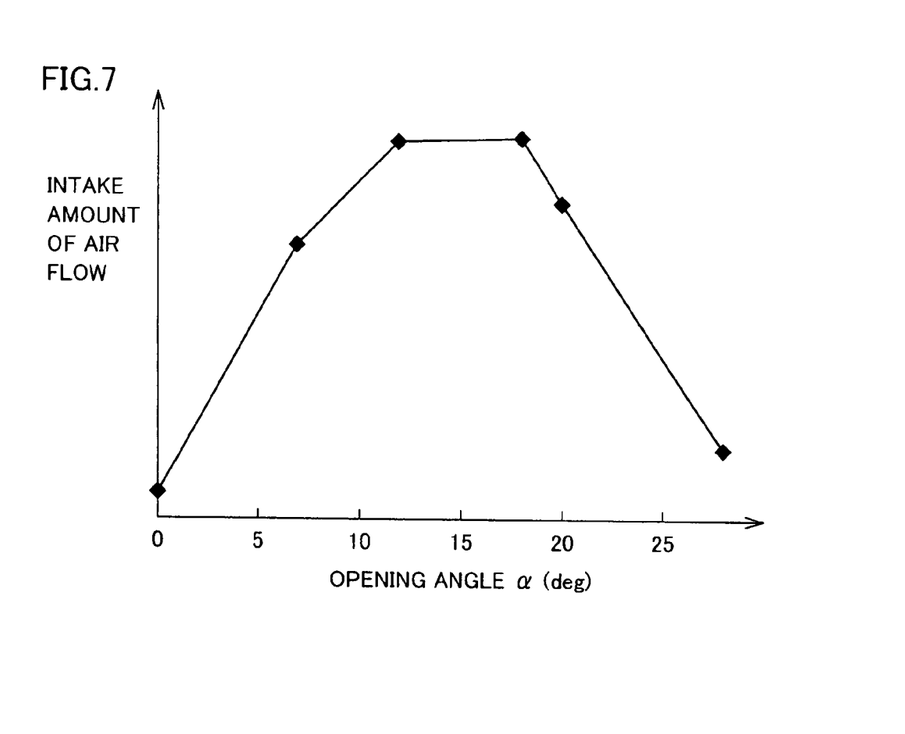
FIG. 7 is a graph representing the relationship between the opening angle of the valve body and the intake amount of air flow in the variable intake device of FIG. 1.

FIG. 7 represents the relationship between the opening angle of the valve body and the intake amount of air flow in the variable intake device of FIG. 1. Referring to FIG. 7, a simulation was run of calculating the intake amount of air flow supplied from intake manifold 11 to intake port 10 by applying a pressure difference between one end 21m and the other end 21n of intake pipe 21. In the simulation, the angle between the direction of the streamline defined by short-circuit pipe 26 indicated by arrow 102 and the extending direction of valve body 32 indicated by arrow 103, i.e. the opening angle α of valve body 32 (refer to FIG. 5), was varied to obtain the intake amount of air flow at each opening angle.

It was confirmed that the intake amount of air flow is increased when valve body 32 is oblique with respect to the direction of the streamline defined by short-circuit pipe 26, as compared to the case where opening angle α is 0°. Increase in the intake amount of air flow was significant particularly in the range of 10° to 20° of opening angle α.

Second Embodiment

Figure 8:
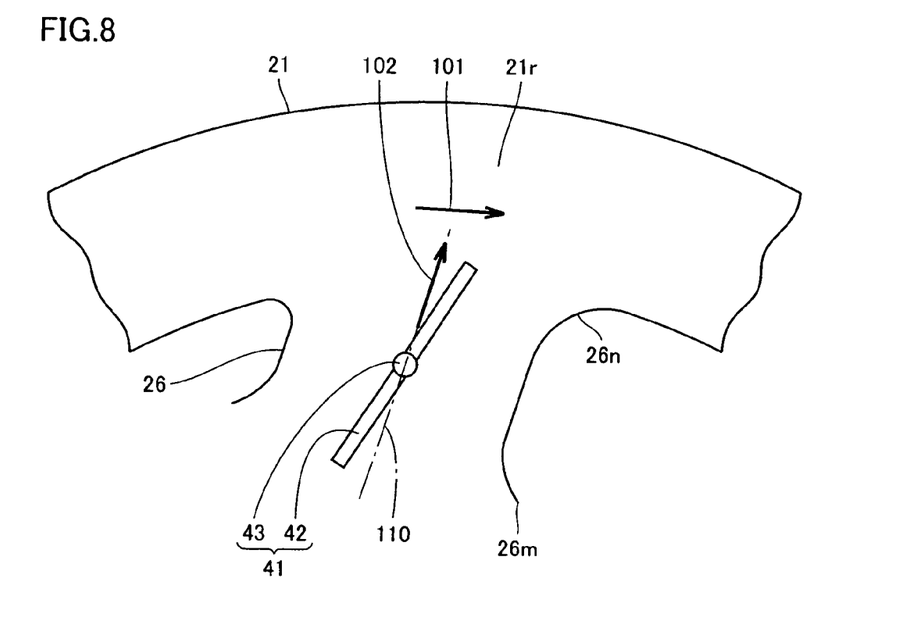
FIG. 8 is a sectional view of a variable intake device according to a second embodiment of the present invention.
Figure 9:
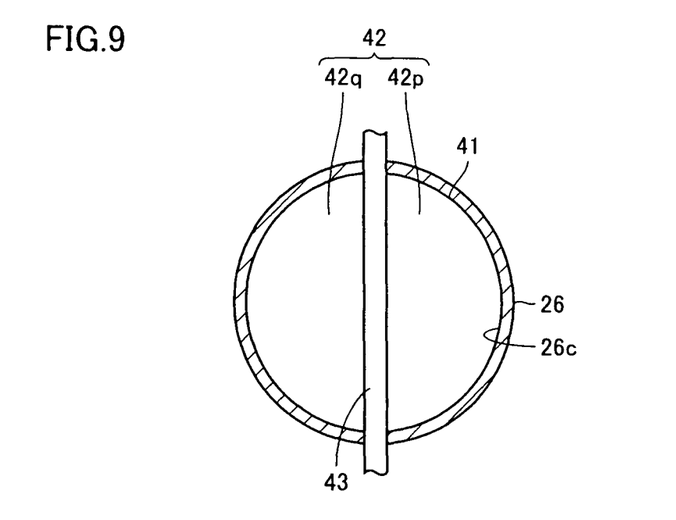
FIG. 9 is a sectional view of a short-circuit pipe provided in the variable intake device of FIG. 8.

FIG. 8 is a sectional view representing a variable intake device according to a second embodiment of the present invention. FIG. 8 corresponds to FIG. 4 of the first embodiment, representing a valve open state. FIG. 9 is a sectional view of a short-circuit pipe provided at the variable intake device of FIG. 8. FIG. 9 corresponds to FIG. 3 of the first embodiment, representing a valve closed state. The variable intake device of the present embodiment basically has a configuration similar to the variable intake device of the first embodiment. Description of an analogous configuration will not be repeated hereinafter.

Referring to FIGS. 8 and 9, an inner wall 26c defining short-circuit pipe 26 has a circular cross section in the present embodiment. A valve 41 including a valve stem 43 and a valve body 42 is arranged in short-circuit pipe 26. Valve body 42 is constituted of portions 42p and 42q taking the same semicircular shape at one side and the other side, respectively, of valve stem 43. Valve stem 43 is provided to coincide with center line 110.

In an open state of valve 41, valve body 42 is positioned to extend in a direction between the direction of the streamline defined by intake pipe 21 at intermediate portion 21r and the direction of the streamline defined by short-circuit pipe 26 at the other end 26n.

By the variable intake device of the second embodiment of the present invention configured as set forth above, advantages similar to those of the first embodiment can be obtained.

Figure 10:
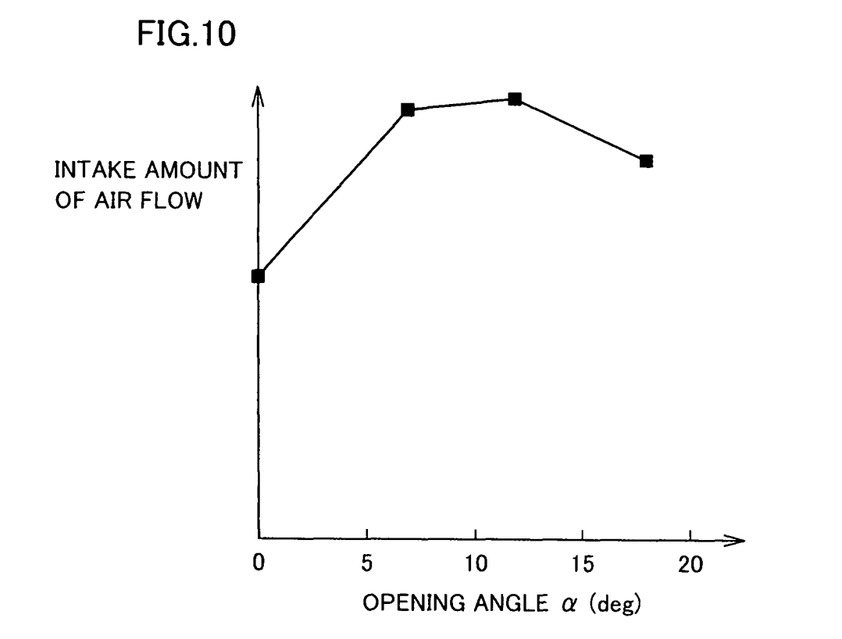
FIG. 10 is a graph representing the relationship between the opening angle of the valve body and the intake amount of air flow in the variable intake device of FIG. 8.

FIG. 10 is a graph representing the relationship between the opening angle of the valve body and the intake amount of air flow in the variable intake device of FIG. 8. Referring to FIG. 10, a simulation described with reference to FIG. 7 in the first embodiment was run similarly for the variable intake device of the present embodiment. It was confirmed that the intake amount of air flow is increased when valve body 42 is oblique with respect to the direction of the streamline defined by short-circuit pipe 26, as compared to the case where the opening angle α is 0°. The increase in the intake amount of air flow was significant particularly in the range of 5° to 15° of opening angle α.

It should be understood that the embodiments disclosed herein are illustrative and non-restrictive in every respect. The technical range of the present invention is defined by the appended claims, and all changes that fall within limits and bounds of the claims, or equivalent thereof are intended to be embraced by the claims.

INDUSTRIAL APPLICABILITY

The present invention is mainly applied to an internal combustion engine such as a gasoline engine and diesel engine.

The invention claimed is:

1. A variable intake device altering an intake path length of an internal combustion engine, comprising:

a main pipe through which air flows towards a combustion chamber of said internal combustion engine, defining a first streamline at a predetermined site of the path, a short-circuit pipe connected at said predetermined site, defining a second streamline extending in a direction intersecting said first streamline at the connected site, and a valve including a valve body regulating air flow, and arranged at said short-circuit pipe adjacent to said predetermined site, wherein said valve body is positioned to extend in a direction between an extending direction of said first streamline and an extending direction of said second streamline, when said valve allows air flow merging into said main pipe from said short-circuit pipe, said valve further including a valve stem rotatably supporting said valve body, wherein said valve stem is provided at a position deviated towards an upstream side of air flow in said main pipe with respect to a center position of a cross section of said short-circuit pipe when cut by a plane orthogonal to an extending direction of said short-circuit pipe;

said valve body is constituted of a first portion extending with a relatively large area at one side of said valve stem, and a second portion extending with a relatively small area at an other side of said valve stem, and said first portion is positioned at a downstream side of air flow at said short-circuit pipe than said second portion, when said valve allows air flow merging into said main pipe from said short-circuit pipe.

* * * * *